(12) United States Patent
Benson

(10) Patent No.: US 10,693,284 B2
(45) Date of Patent: Jun. 23, 2020

(54) GROUNDING SWITCH FOR USE IN METAL-CLAD SWITCHGEAR

(71) Applicant: Seth Benson, Arlington, TX (US)

(72) Inventor: Seth Benson, Arlington, TX (US)

( * ) Notice: Subject to any disclaimer, the term of this patent is extended or adjusted under 35 U.S.C. 154(b) by 85 days.

(21) Appl. No.: 16/059,836

(22) Filed: Aug. 9, 2018

(65) Prior Publication Data
US 2019/0052067 A1 Feb. 14, 2019

Related U.S. Application Data

(63) Continuation of application No. 62/543,197, filed on Aug. 9, 2017.

(51) Int. Cl.
| | | |
|---|---|---|
| *H02B 11/133* | (2006.01) | |
| *H01H 31/00* | (2006.01) | |
| *H02B 1/16* | (2006.01) | |
| *H02B 1/14* | (2006.01) | |
| *H02B 13/02* | (2006.01) | |
| *H02B 11/28* | (2006.01) | |
| *H02B 11/24* | (2006.01) | |
| *H02B 11/18* | (2006.01) | |
| *H01H 31/16* | (2006.01) | |

(52) U.S. Cl.
CPC .......... *H02B 11/133* (2013.01); *H01H 31/003* (2013.01); *H02B 1/14* (2013.01); *H02B 1/16* (2013.01); *H02B 11/18* (2013.01); *H02B 11/24* (2013.01); *H02B 11/28* (2013.01); *H02B 13/02* (2013.01); *H01H 31/16* (2013.01)

(58) Field of Classification Search
CPC .......... H02B 1/14; H02B 1/16; H02B 11/133; H02B 11/28
See application file for complete search history.

(56) References Cited

U.S. PATENT DOCUMENTS

| | | | | |
|---|---|---|---|---|
| 2,735,042 A | * | 2/1956 | Hayford et al. ..... | H02B 11/167 361/607 |
| 2,820,862 A | * | 1/1958 | Carmichael ......... | H01H 31/003 200/48 R |
| 7,297,890 B2 | * | 11/2007 | Corti ................... | H01H 31/003 200/400 |

(Continued)

FOREIGN PATENT DOCUMENTS

| | | | | |
|---|---|---|---|---|
| CN | 104485248 A | * | 4/2015 | |
| CN | 104600577 A | * | 5/2015 | |

(Continued)

*Primary Examiner* — Robert J Hoffberg
(74) *Attorney, Agent, or Firm* — Michael L. Greenberg, Esq.; Greenberg & Lieberman, LLC

(57) ABSTRACT

A metal-clad compliant grounding/earthing switch device configured for use within conventional switchgear is described. The device is equipped with adequate and compliant insulation of all bus connections, and is configured to close during maintenance outages grounding the live parts of the circuit feed by a particular breaker. The device enables electricians to perform maintenance and repairs in the event of an outage safely, and without the need to manually install a temporary Ground-and-Test Device. An insulated clam shell is present to limit fault propagation from live components until components are confirmed as grounded prior to maintenance of the switchgear.

7 Claims, 6 Drawing Sheets

(56) References Cited

U.S. PATENT DOCUMENTS

| | | | | |
|---|---|---|---|---|
| 8,748,760 B2 * | 6/2014 | Miller | ............... | H01H 31/003 |
| | | | | 200/255 |
| 9,196,438 B2 * | 11/2015 | Senne | ............... | H01H 33/022 |
| 9,368,946 B2 * | 6/2016 | Miller | ............... | H01H 31/003 |
| 9,530,591 B2 * | 12/2016 | Senne | ............... | H01H 33/022 |

FOREIGN PATENT DOCUMENTS

| | | | | | |
|---|---|---|---|---|---|
| CN | 204632601 U | * | 9/2015 | | |
| CN | 205335111 U | * | 6/2016 | | |
| CN | 207074620 U | * | 3/2018 | | |
| CN | 209822540 U | * | 12/2019 | | |
| EP | 3367408 A1 | * | 8/2018 | ......... | H01H 31/003 |
| KR | 101809914 B1 | * | 1/2018 | | |

* cited by examiner

GROUNDING SWITCH FOR USE IN METAL-CLAD SWITCHGEAR

CONTINUITY

This application is a non-provisional patent application of provisional patent application No. 62/543,197, filed on Aug. 9, 2017, and priority is claimed thereto.

FIELD OF THE PRESENT INVENTION

The present invention relates in general to electrical switches, and more specifically relates to a new form of grounding/earthing switch configured for use in ANSI metal-clad switchgear such that the metal-clad requirement for insulated bus and associated connections is maintained.

BACKGROUND OF THE PRESENT INVENTION

It is known that, in a conventional electric power system, switchgear is disposed in communication with the system. Switchgear conventionally contains an assortment of disconnect switches, circuit breakers, insulators, and fuses, configured to facilitate repairs of the electric power system. Conventionally, switchgear is employed to de-energize portions of the system such that repairs/maintenance may be performed and faults may be cleared, ensuring electric system reliability.

Metal-clad switchgear is compartmentalized utilizing grounded metal barriers for major parts of the circuit, helping minimize fault propagation and to make repairs easier and safer. In addition to compartmentalization, all electrical bus is required to be insulated to further minimize a potential flashover or fault between phases of circuits within the metal-clad switchgear. During maintenance of the switchgear or the power circuits that are protected/switched by this switchgear, standard electrical practices require the use of temporary installed grounding devices to protect the electrician from accidental energization of the power equipment of the system. A permanently installed grounding switch which is utilized only during maintenance could meet this safety practice requirement better than temporary installed devices because it can be remotely operated minimizing contact with the live system and acting as insurance in the event that a switching device or automated system malfunctions and inadvertently closed a switch, or an energy storage device was not discharged. Unfortunately, present grounding switches do not have a way of meeting the ANSI/IEEE metal clad requirement of all live parts or bus being insulated without adding additional compartments, space requirements, and significant cost.

One standard practice in metal-clad switchgear grounding is a Ground and Test Device, colloquially referred to as 'the widow maker.' The ground-and-test-device is not a permanently installed device in the switchgear, and therefore must be temporarily connected manually to the live bus of the switchgear. If something goes wrong during the connection or thereafter, the energy of the system is known to be so great that it would severely burn or kill the electrician conducting maintenance or repair. Commonly, the electrician would die weeks later due to infection from the burns.

If there were a grounding/earthing switch that was configured to maintain metal-clad requirements, ensuring proper insulation of all connections, safety of the electricians would be greatly increased, helping to prevent unneeded injuries and/or death.

Thus, there is a need for a new form of grounding/earthing switch that maintains metal-clad requirements while remaining a permanent fixture of the switchgear. Such a switch device is preferably properly insulated during normal or emergency switchgear operation. During maintenance however, the switch is not required to be insulated.

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a metal-clad ground switch configured for permanent installation in conventional switchgear of electric power systems. The present invention is configured for use as a safety device for the protection of electricians present on site for maintenance or repair of the switchgear or circuits that it feeds. The present invention is a modification to/adaptation of a typical grounding/earthing switch devices, configured to insulate all live parts of the switch and connections and automatically in the event of maintenance operation, open the insulation system to allow the live parts to be grounded.

In contrast, a conventional Ground and Test Device requires removal of a circuit breaker and insertion of the Ground and Test Device. It is not insulated, but is not in the switchgear during normal or emergency operation-only maintenance mode.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention.

The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 2:
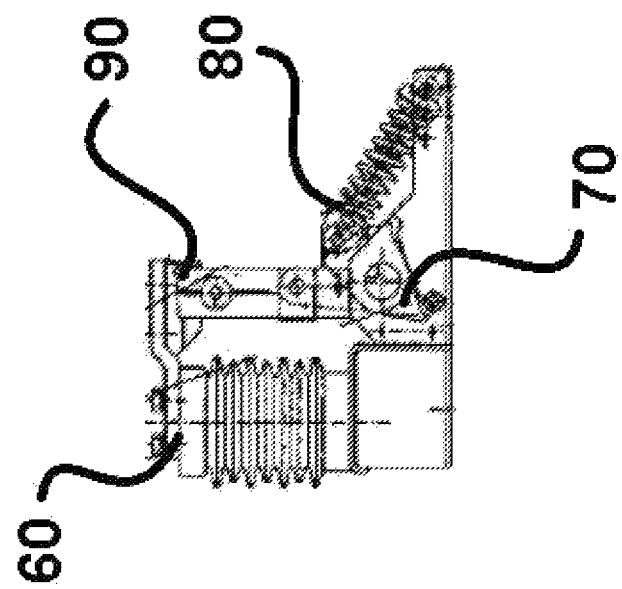
FIG. 2 details a close-up view of the metal-clad ground switch of the present invention, as shown from the side.
Figure 1:
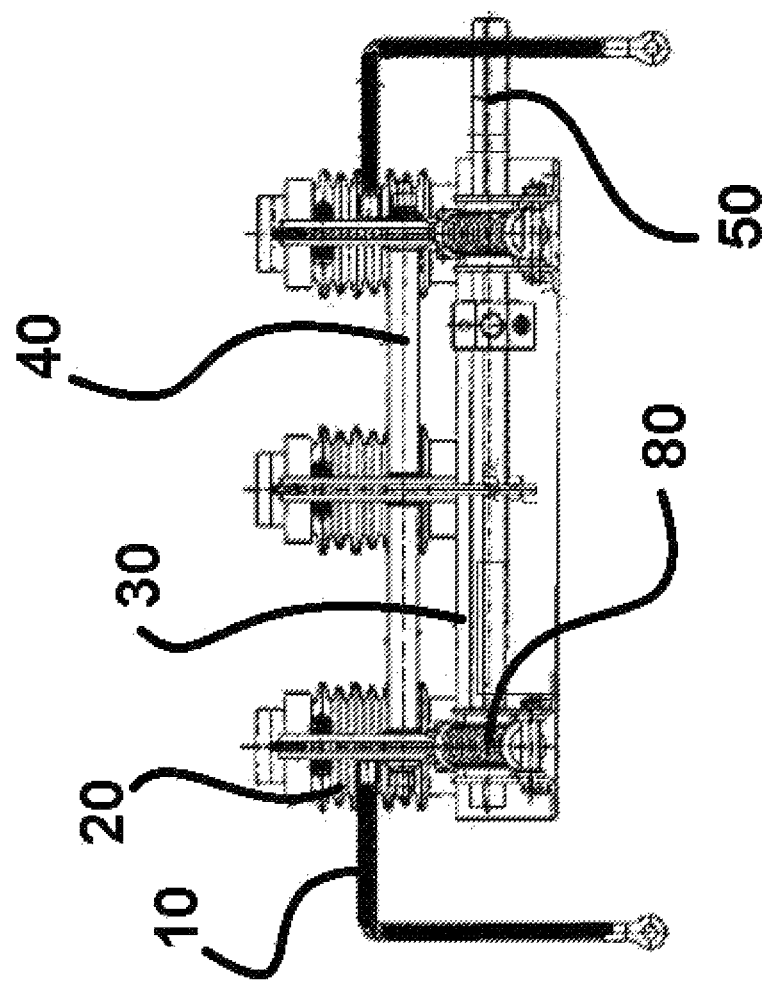
FIG. 1 depicts a schematic of the device of the present invention, shown removed from a conventional switchgear.

As depicted in FIG. 1 and FIG. 2, the present invention is a metal-clad grounding/earthing switch configured for use in switchgear installations of conventional electric power supply systems. The preferred embodiment of the present invention is similar to a typical grounding switch, with a fixed contact (60), a crankarm (70) and a moveable contact (90) in communication with an axis (50), at least one spring (80) and at least one flexible connection (10). A sensor (20), per convention, may be present to detect the presence of voltage. The unique portion of the switch device of the present invention is how all live parts are insulated or grounded and isolated during normal switchgear use, including the fixed contact(s) (60) which are insulated, namely via an insulating boot (65), frame (75), and an insulated clam shell (85). At least one support (30) is preferably employed to mount the present invention in position securely within the metal-clad casing. A conductive shorting pipe (40) between phases, per conventional switchgear, is additionally present.

The general process of use of the device of the present invention is preferably as follows:

When maintenance is needed, a qualified technician/electrician opens a circuit breaker by a control switch at the switchgear location, racks out the circuit breaker, tests for the presence of voltage, and then closes this grounding switch on that circuit. The typical grounding switch is preferably motor operated so that it may be done remotely. Sometimes, the presence-of-voltage test is tricky since charge can accumulate in the insulation of shielded cables or in capacitor devices. The present invention is designed to withstand (close and maintain ground) until an upstream device, usually a breaker or fuse, would open in the case that the circuit was still energized by an unintended source, or an error was made in which the circuit was intended to open for maintenance. This is how the device of the present invention is safer than present grounding methods.

In contrast, the conventional Ground and Test Device however would work similarly, except the process is slower, and the device is more expensive. The Ground and Test Device is racked in to the breaker compartment after the breaker is racked out. The device has 6 stabs/connections to the main bus, 3 phases and the load/source 3 phases. If the technician uses the wrong ones, it can kill him/her.

As such, it should be understood that the insulated boot, as well as the clam shell with its operating linkages are the unique features of the present invention. Additionally, the placement and orientation of the components of the present invention enable the device of the present invention to be mounted inside of the rear cable compartment of the switchgear without the need to create a new compartment. The device of the present invention is therefore smaller than alternatives presently on the market, and may be permanently installed to the switchgear, or indeed, installed during manufacturing, in order to prevent unnecessary injury.

Figure 3:
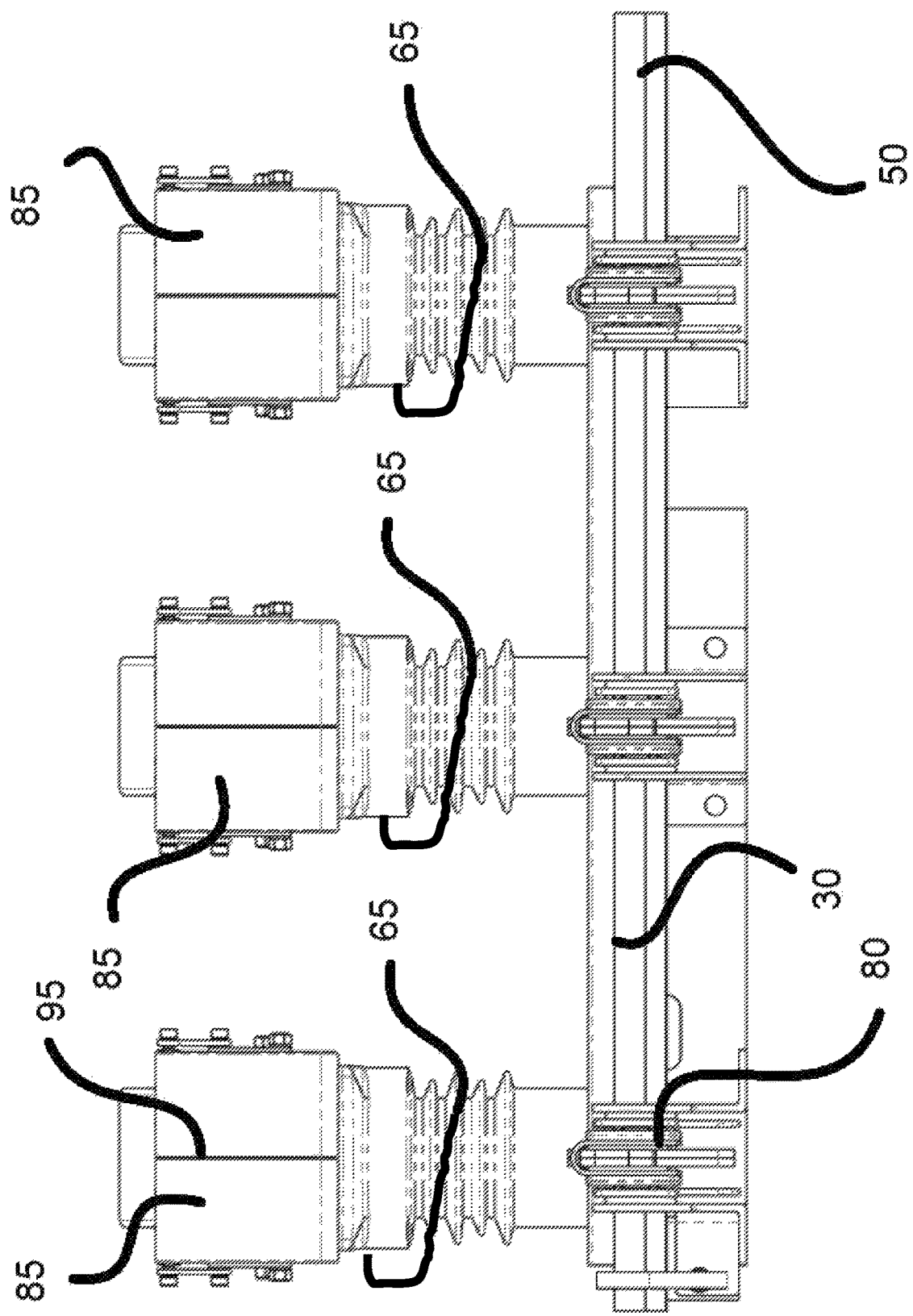
FIG. 3 shows a view of an alternate preferred embodiment of the metal-clad ground switch of the present invention, as seen from the front.
Figure 4:
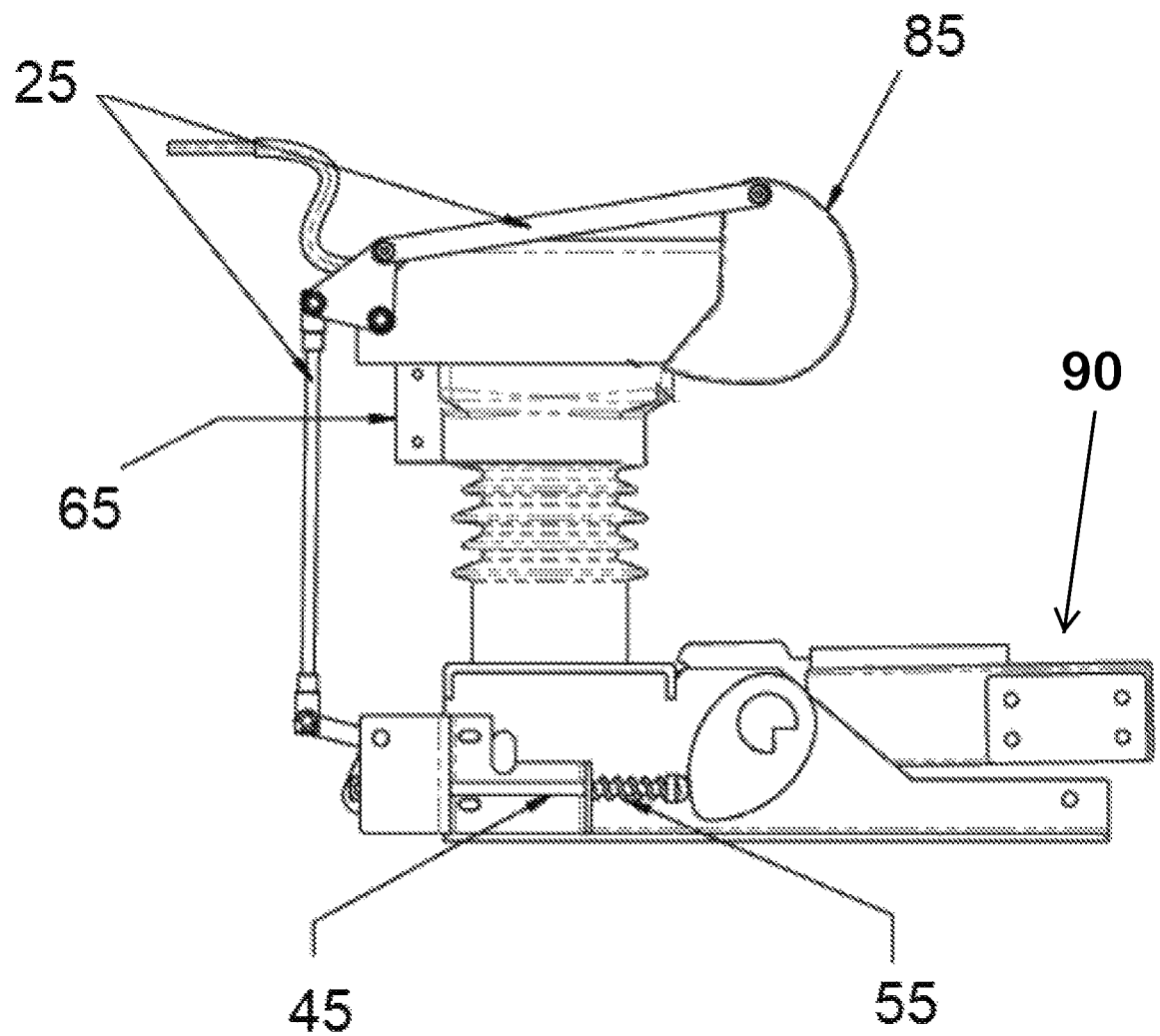
FIG. 4 exhibits a view of the alternate preferred embodiment of the metal-clad ground switch of the present invention as seen from the side, and in the closed position.
Figure 5:
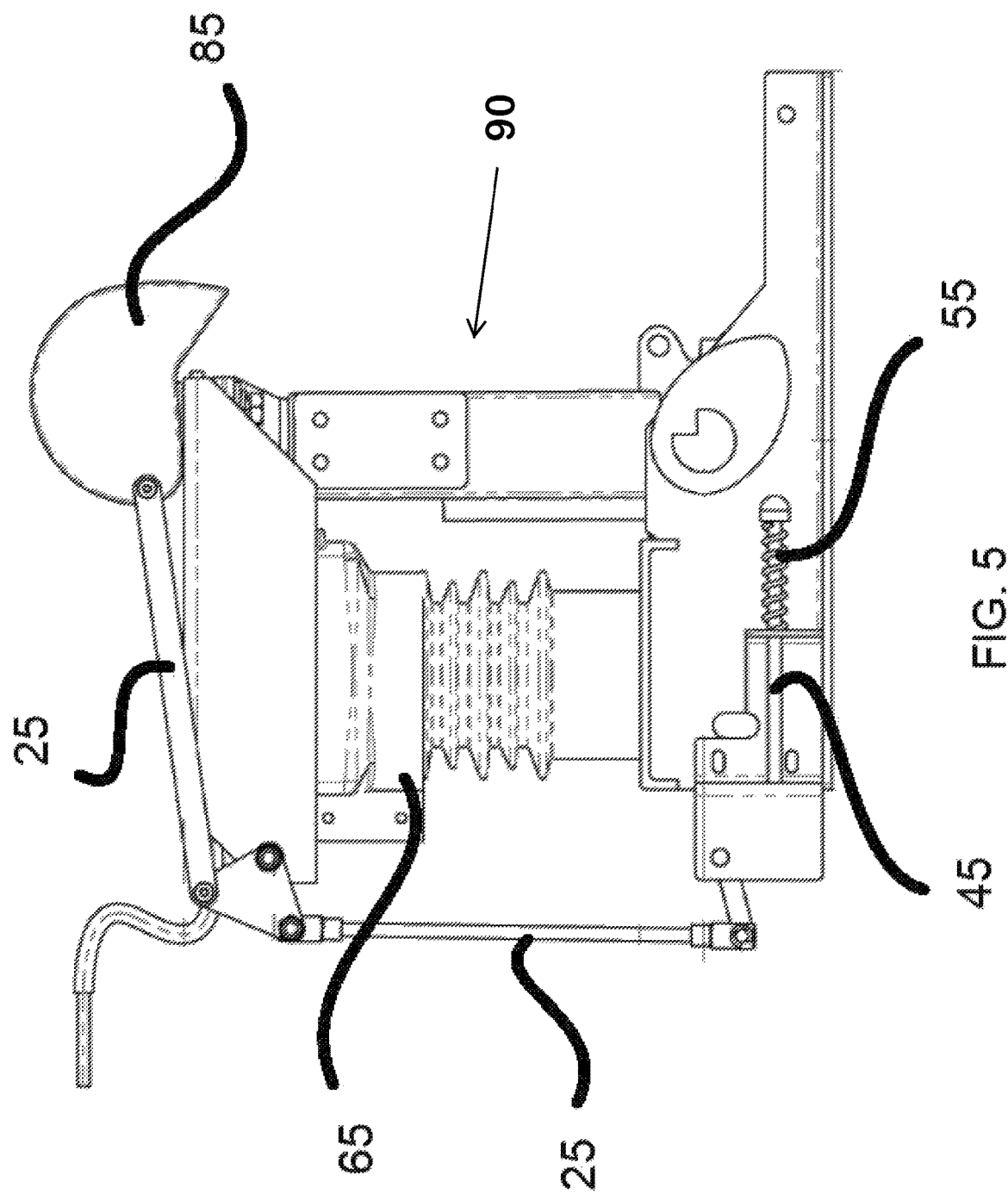
FIG. 5 depicts a view of the alternate preferred embodiment of the metal-clad ground switch of the present invention as seen from the side, and in the open position.

An alternate preferred embodiment of the present invention, as depicted in FIGS. 3-5, is equipped with similar components than the embodiment disclosed in FIG. 1 and FIG. 2. The primary differences being the arrangement of the frame (75) and insulating clam shell (85). An aluminum push rod (45) is in communication with a spring (55) as shown in FIG. 4. Insulated linkages (25) facilitate the movement of the insulating clam shell (85) such that it may be opened and closed when it is safe to do so.

Differences between the alternate preferred embodiment disclosed in FIGS. 3-5 and the first embodiment disclosed in FIGS. 1-2 include a larger overall height of the standoff in order to accommodate a higher BIL rating to facilitate operation of an internal voltage sensor, and also to potentially provide for operation with higher voltage levels in general. Additionally, the insulated clam shell (85) is preferably of a break-away construction as a fail-safe mechanism.

Another difference between the two embodiments is that a steel cable is employed to manipulate the insulated clam shell (85) in an embodiment, whereas the alternate preferred embodiment employs the spring (55) and aluminum rod (45) to manipulate the insulated clam shell (85). When the insulated clam shell (85) of the present invention closes (as the main switch blades of the switch gear open), the aluminum rod (45) drives the insulated clam shell (85) closed, compressing the spring. To reverse, the spring (55) forces the insulated clam shell (85) open. Additionally, auxiliary switches have been added in the alternate preferred embodiment, which are used to control the circuit status indication. Also of note, a mechanical interlock with the breaker racking mechanism or breaker open status to prevent closing the grounding switch on an energized circuit, is preferably present in the form of a steel push/pull cable, which is intended for use with a window (conventionally present) in the rear of the switchgear to view the visible ground in place prior to opening a door or removing a panel at the switchgear site.

Figure 6:
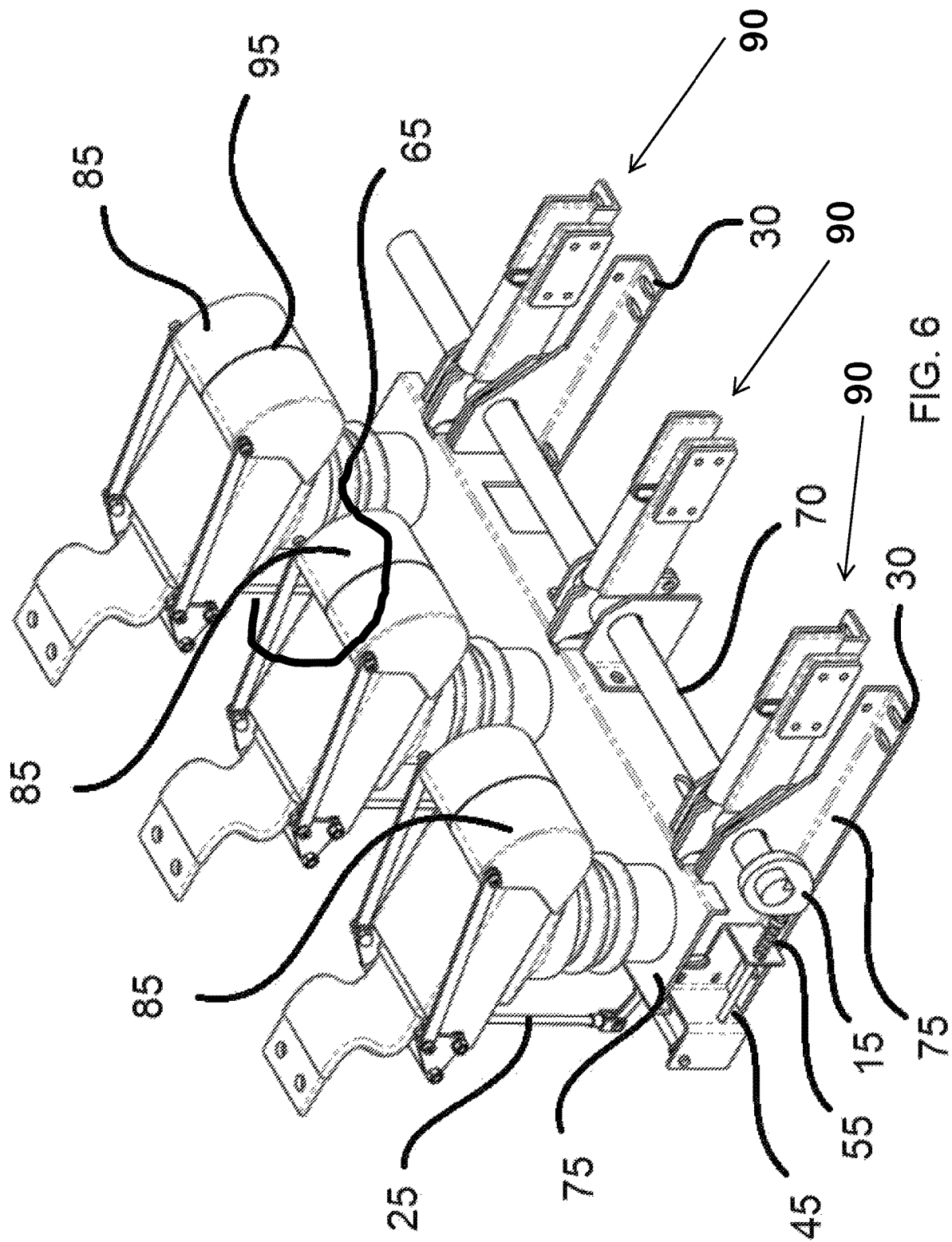
FIG. 6 shows a perspective view of the alternate preferred embodiment of the present invention.

It should be understood that the mechanism by which the insulated clam shell (85) is opened and closed, in the preferred embodiment of the present invention, amounts to the effect of the spring (55) and aluminum push rod (45). Once the main switch blade of the switchgear begins to move, a cam (15) rotates, taking pressure off the spring (55), causing the force of the spring to open the insulated clam shell (85). The fail-safe incorporated into the insulated clam shell (85) is that the insulated clam shell (85) is equipped with a deliberate split (95) extending down the center of the shell as depicted in FIG. 3 and FIG. 6, helping to facilitate a break of the shell easily if needed.

Figure 7:
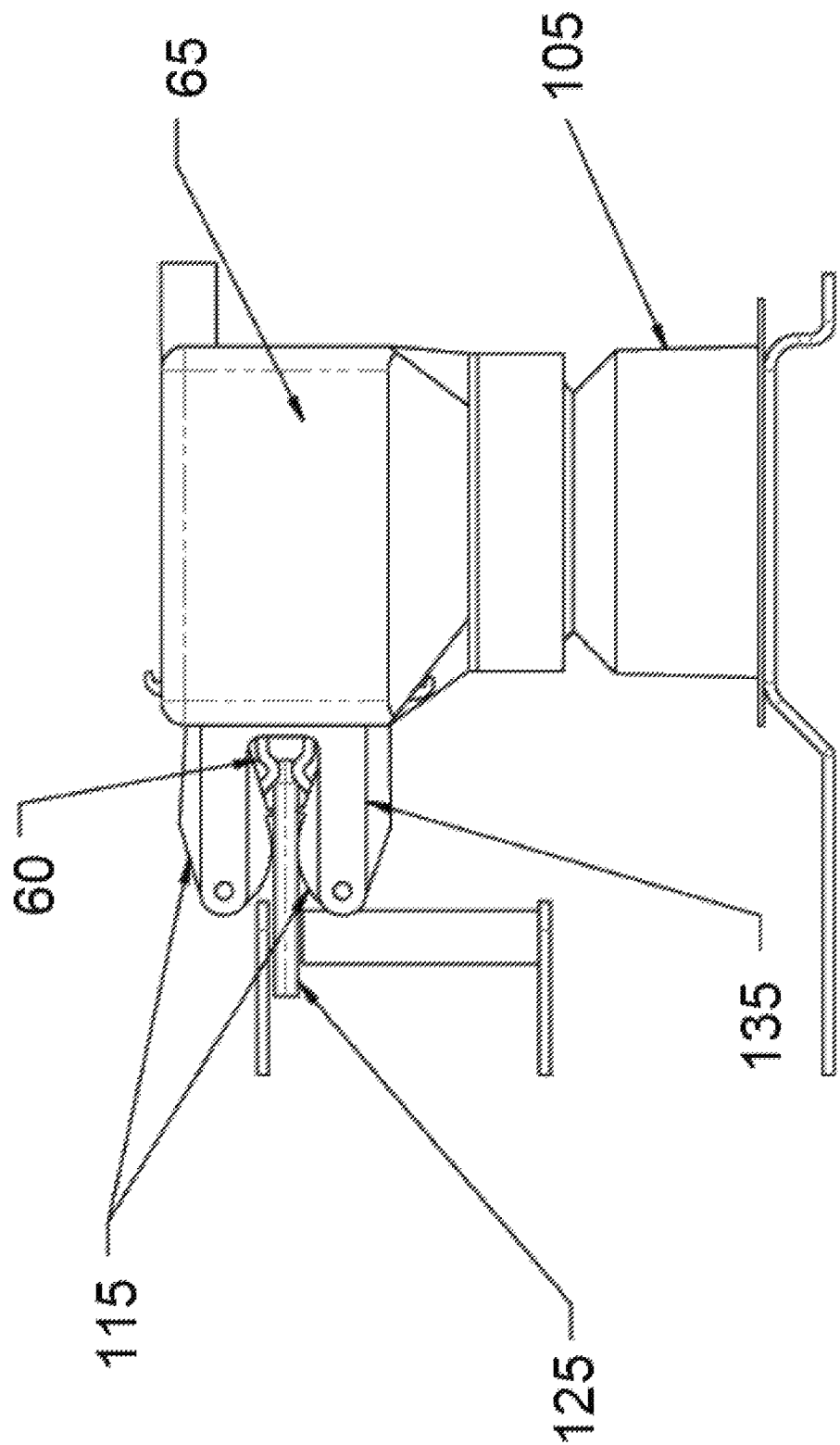
FIG. 7 depicts a side view of a second alternate preferred embodiment of the present invention, showing a linear switch design in the closed position.

Additionally, other embodiments of the present invention are preferably available based on the needs of the installation. For example, the present invention is preferably available in 40 KA and/or 50 KA momentary withstand (fault current) versions which maintain a virtually identical appearance, but may facilitate a wider variety of voltage ranges, including, but not limited to 0.5 KV, 15 KV, 27 KV, or 38 KV. Other embodiments equipped with a linear switch, as disclosed in FIG. 7 can reach up to 63 KA, with similar voltage levels. In such embodiments equipped with a linear switch, a standoff insulator (105) is present above the frame (75). Hinged insulating gates (115) protect the fixed contact (60), and a moving contact (125), acting as a ground bar, is configured to move into position to ground the switch. The hinged insulating gates (115) are preferably composed of rigid insulating material. An insulating frame (135) further protects the hinged insulating gates (115) as depicted in FIG. 7.

It should be understood that the materials employed in the construction and installation of the metalclad equipment of the present invention is fire retardant and complies with known codes and regulations (exceeding IEC compliance). Conventional materials are preferably used. Some components of the present invention may be 3D printed to ease and expedite manufacturing. Given that various materials in the 3D printing industry are evolving, more components may be made via a 3D printer in the future. 3D printable flame-retardant ABS plastic may be used for links and bell cranks of the apparatus. Additionally, polycarbonate plastics may be employed in the construction of the insulating clam shell (85) of the present invention.

Alternate embodiments of the present invention may be designed to be smaller than those disclosed in the figures. The smaller, more compact version of the device of the present preferably employs linear motion instead of rotational motion of the main contacts to close. Additionally, other embodiments may alter the means by which the insulation opens in order to allow a contact to penetrate the insulation system. A third embodiment exhibits a switch design equipped with an insulation system that is pushed open/out of the way by the contacts, instead of opening via linkages.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A grounding switch for use in a metal-clad switchgear, comprising:
    an earth switching device, said earth switching device including:
        at least one fixed contact, said at least one fixed contact is insulated; and
        at least one movable contact selectively connected to the at least one fixed contact to ground said at least one fixed contact, said at least one movable contact rotating about an axis;
    a crankarm, said crankarm rotating about the axis;
    an insulating boot, said insulating boot configured to insulate a first portion of live components of said at least one fixed contact;
    an insulated clam shell, said insulated clam shell covering a second portion of said live components of said at least one fixed contact until said live components are grounded, at which time, said insulated claim shell is configured to open, providing access for maintenance to the metal-clad switchgear; and
    wherein said insulated claim shell is equipped with a deliberate split disposed at a center of said insulated claim shell to facilitate break-away of said insulated claim shell as a fail-safe precaution.

2. The grounding switch of claim 1, further comprising:
    an aluminum rod, said aluminum rod coupled to said insulated clam shell;
    a spring;
    wherein said aluminum rod is configured to convey force to said spring when said insulated clam shell is closed; and
    wherein said spring is configured to convey force to said insulated clam shell, opening said insulated clam shell.

3. The grounding switch of claim 2, further comprising: insulated linkages; and
    wherein said insulated linkages convey motion of said aluminum push rod and said spring to facilitate movement of said insulated clam shell.

4. The ground switch of claim 3, wherein said insulated clam shell is composed of polycarbonate plastic.

5. The grounding switch of claim 3, wherein said aluminum rod drives said insulated clam shell closed, compressing said spring.

6. The grounding switch of claim 1, wherein said insulated clam shell is composed of polycarbonate plastic.

7. A grounding switch for use in metal-clad switchgear comprising:
    an earth switching device, said earth switching device including:
        at least one fixed contact, said at least one fixed contact is insulated; and
        at least one movable contact selectively connected to the at least one fixed contact to ground said at least one fixed contact, said at least one movable contact rotating about an axis;
    a crankarm, said crankarm rotating about the axis;
    an insulating boot, said insulating boot configured to insulate a first portion of live components of said at least one fixed contact;
    an insulated clam shell, said insulated clam shell covering a second portion of said live components of said at least one fixed contact until said live components are grounded, at which time, said insulated claim shell is configured to open, providing access for maintenance to the metal-clad switchgear;
    wherein said insulated clam shell is equipped with a deliberate split disposed at a center of said insulated clam shell to facilitate break-away of said insulated clam shell as a fail-safe precaution;
    an aluminum rod, said aluminum rod coupled to said insulated clam shell;
    a spring;
    wherein said aluminum rod is configured to convey force to said spring when said insulated clam shell is closed;
    wherein said spring is configured to convey force to said insulated clam shell, opening said insulated clam shell; and
    wherein said insulated clam shell is composed of polycarbonate plastic.

* * * * *